US009223599B1

(12) United States Patent
Racanelli et al.

(10) Patent No.: US 9,223,599 B1
(45) Date of Patent: Dec. 29, 2015

(54) CLIENT-SIDE SERVER FOR CLIENT-SIDE SCRIPTING LANGUAGES

(75) Inventors: Dan Racanelli, San Francisco, CA (US); Ian Dunn, San Francisco, CA (US); Robert Aaron Jones, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 362 days.

(21) Appl. No.: 13/436,356

(22) Filed: Mar. 30, 2012

(51) Int. Cl.
*G06F 9/44* (2006.01)
*G06F 9/455* (2006.01)
*G06F 9/45* (2006.01)

(52) U.S. Cl.
CPC .................. *G06F 9/45512* (2013.01)

(58) Field of Classification Search
None
See application file for complete search history.

(56) References Cited

U.S. PATENT DOCUMENTS

| | | | | |
|---|---|---|---|---|
| 5,583,983 A * | 12/1996 | Schmitter | | 717/138 |
| 6,662,362 B1 * | 12/2003 | Arora et al. | | 717/154 |
| 8,136,100 B1 * | 3/2012 | Goldman | | 717/136 |
| 8,209,709 B2 * | 6/2012 | Fleming | | 719/318 |
| 8,365,203 B2 * | 1/2013 | Wong et al. | | 719/328 |
| 8,612,930 B2 * | 12/2013 | Quinn et al. | | 717/106 |
| 8,683,462 B2 * | 3/2014 | Goldman | | 717/174 |
| 2005/0188382 A1 * | 8/2005 | Nagendra et al. | | 719/328 |
| 2009/0083643 A1 * | 3/2009 | Beringer | | 715/762 |
| 2010/0017461 A1 * | 1/2010 | Kokkevis et al. | | 709/203 |
| 2010/0095284 A1 * | 4/2010 | Herring et al. | | 717/148 |
| 2010/0100591 A1 * | 4/2010 | Mahaffey et al. | | 709/204 |
| 2011/0314389 A1 * | 12/2011 | Meredith et al. | | 715/751 |
| 2012/0233477 A1 * | 9/2012 | Wu et al. | | 713/320 |
| 2013/0033508 A1 * | 2/2013 | Labour et al. | | 345/522 |
| 2013/0047074 A1 * | 2/2013 | Vestergaard et al. | | 715/234 |
| 2013/0047150 A1 * | 2/2013 | Malasky et al. | | 717/176 |
| 2013/0080805 A1 * | 3/2013 | Vick et al. | | 713/320 |
| 2013/0167111 A1 * | 6/2013 | Moore et al. | | 717/105 |

* cited by examiner

*Primary Examiner* — Don Wong
*Assistant Examiner* — Hossain Morshed
(74) *Attorney, Agent, or Firm* — Schwegman Lundberg & Woessner, P.A.

(57) ABSTRACT

A method of executing a cross-platform application on a system is disclosed. An instruction pertaining to an execution of the cross-platform application on the system is received. Based on a determination that the instruction pertains to a rendering of an element of a user interface of the cross-platform application on the system, the instruction is sent across a bridge to an engine executing in the native layer to process the instruction at the native layer. Alternatively, based on a determination that the instruction does not pertain to a rendering of the element of the user interface of the cross-platform application on the system, the instruction is sent to an engine executing in the cross-platform layer of the system to process the instruction at the cross-platform layer.

17 Claims, 8 Drawing Sheets

US 9,223,599 B1

CLIENT-SIDE SERVER FOR CLIENT-SIDE SCRIPTING LANGUAGES

TECHNICAL FIELD

The present disclosure generally relates to implemented user interfaces and, in one specific example, to implementing a user interface of a cross-platform web application on multiple devices having a same cross-platform layer but different native layers.

BACKGROUND

When developing web-application code that is to be executed within a client program executing on a device (e.g., to support an implementation of a user interface of a web application that is accessed from the device), a developer typically must choose between developing the web-application code for the native layer (e.g., operating system) of the device (e.g., in C or Objective C for the Apple iOS devices or in Java for Android devices) or developing the web-application code for a cross-platform layer supported by the device (e.g., in JavaScript, AJAX, or another web-application development technology that enables the same web-application code to be executed on multiple devices having different native layers).

An advantage of developing the web-application code for a cross-platform layer supported by the device is that the web-application code will execute on additional devices that also support the same cross-platform layer. However, for various reasons, including that the cross-platform layer is at least one layer removed from the underlying hardware (e.g., the processor and memory) or software (e.g., a graphics engine) of the device, there may be disadvantages to implementing the web-application code in the cross platform layer. For example, the cross-platform layer may not support access to native features of the device (e.g., a gyroscope, accelerometer, camera, video camera, vibration mechanism, and so on) or the level of performance may be poor relative to the level of performance of the web application if it was implemented for the native layer of the device. For example, application code developed for the cross-platform layer of the device may not be able to draw advanced, complex, or three-dimensional animations, whereas application code developed for the native layer of the device may be able to draw such animations.

BRIEF DESCRIPTION OF THE DRAWINGS

Some embodiments are illustrated by way of example and not limitation in the figures of the accompanying drawings in which.

DETAILED DESCRIPTION

Figure 1:
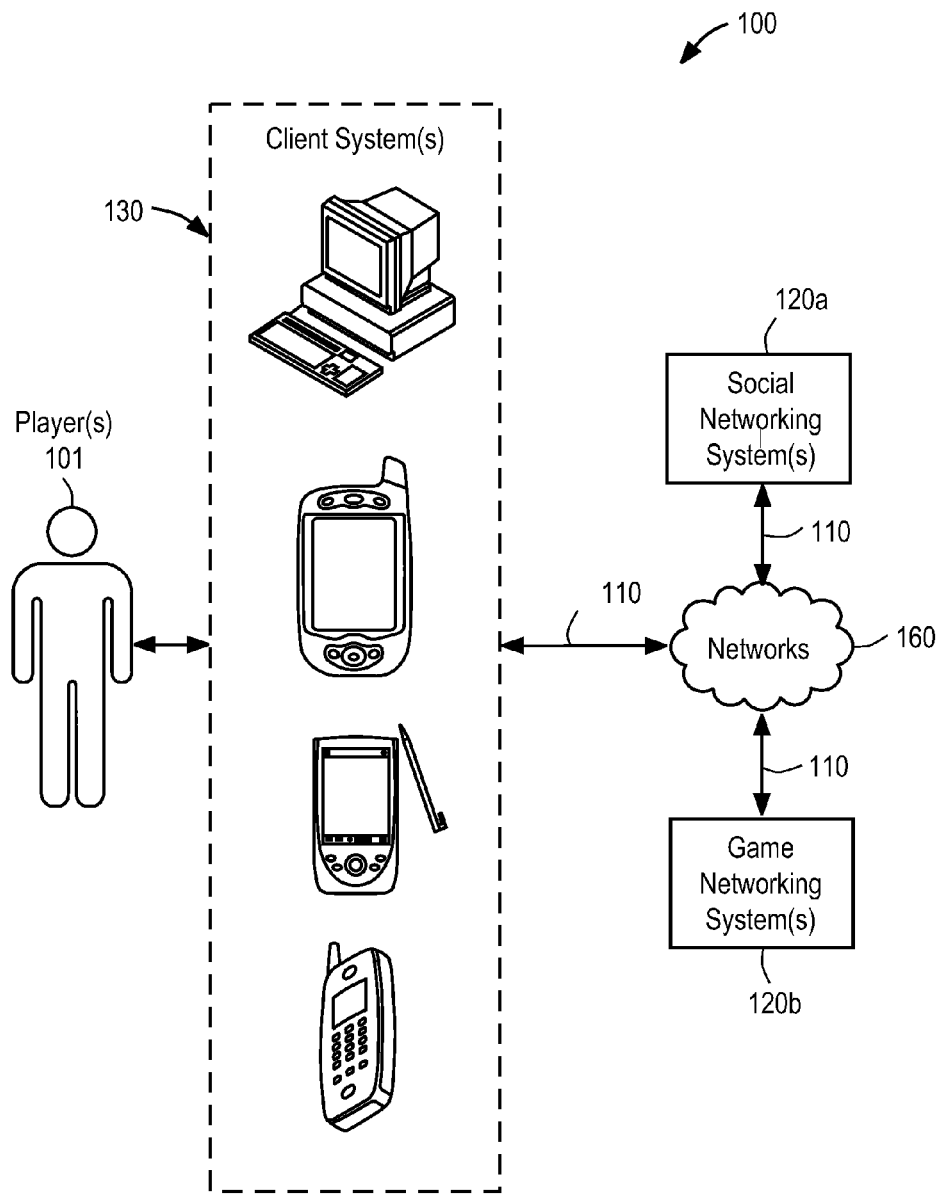
FIG. 1 is a block diagram illustrating an example of a system for implementing various disclosed embodiments.

In the following description, for purposes of explanation, numerous specific details are set forth in order to provide an understanding of various embodiments of the present subject matter. It will be evident, however, to those skilled in the art that various embodiments may be practiced without these specific details.

In various embodiments, a method of executing cross-platform application code in a client environment of a device is disclosed. A module executing on the device receives the cross-platform application code from an application server. The module determines whether the cross-platform application code invokes an application programming interface (API) corresponding to a view object that is specific to the device. If the cross-platform application code invokes the API corresponding to the view object, the module establishes a bridge between the API of the view object and a native-code engine that is executing on the device. The module then invokes an API of the native-code engine via the bridge, the API of the native-code engine corresponding to the API of the view object. If the cross-platform application code does not invoke the API of the view object, the module sends the cross-platform application code to a cross-platform application engine for processing.

A various embodiments, a method of rendering a feature of a user interface of a cross-platform application on a device is disclosed. A module executing on the device receives an instruction to render the feature of the user interface of the cross-platform application. If the device has received compiled native code that is configured to render the feature of the user interface of the cross-platform application on the device, the module sends the instruction to an engine executing in a native layer of the device for processing of the instruction by the compiled native code. Otherwise, the module sends the instruction to an engine executing in a cross-platform layer of the device for processing.

In various embodiments, a method of enabling access to native features specific to each of multiple devices from a common cross-platform programming code used to implement a user interface of a cross-platform application on each of the multiple devices is disclosed. The cross-platform programming code used to implement the user interface of the cross-platform application on each of the multiple devices is architected into a model-view-controller pattern. At least a portion of the view element of the model-view-controller architecture is implemented in compiled programming code that is native to a first one of the multiple devices, the first one of the multiple devices having a first operating system. The same portion of the view element of the model-view-controller architecture is also implemented in compiled programming code that is native to a second one of the multiple devices, the second one of the multiple devices having a second operating system that is different from the first operating system. The compiled native code is deployed to each of the first one of the multiple devices and the second one of the multiple devices, respectively.

An application program interface (API) of a programming object is implemented in the cross-platform programming code that is an abstraction of an API corresponding to the programming code that is native to the first one of the multiple devices and an abstraction of an API corresponding to the programming code that is native to the second of the multiple devices. A bridge is deployed on each of the first one of the multiple devices and the second one of the multiple devices, the bridge enabling the API of the programming object to access that native compiled code of the first one of the multiple devices and the second one of the multiple devices, respectively. A controller element of the model-view-controller architecture of the cross-platform application is deployed and executed on each of the first one of the multiple devices and the second one of the multiple devices. The controller distributes the processing of the instructions of the cross-platform programming code to either the compiled native code across the bridge or a cross-platform engine executing on the device.

Thus, a software developer is provided with a single programming object that is usable within a cross-platform programming environment and is configured to access native features of multiple devices having different operating systems. In various embodiments, the API of the single programming object is selected to correspond to native features of the multiple devices that are otherwise inaccessible from the cross-platform programming environment.

In various embodiments, a method of developing a cross-platform application (e.g., an HTML5 application) that looks and feels like it was developed as a native application (e.g., an iOS or Android application) is disclosed. Programming code of the cross-platform application is received at a client system. A controller (e.g., a JavaScript controller) executing on the client system determines that execution of at least a portion of the received programming code would implicate a view layer of the cross-platform application. For example, the controller may determine that execution of at least the portion of the received program code would affect a graphical feature of the cross-platform application. For example, the controller may determine that execution of the portion of the programming code would render an animation on the client system. The controller sends instructions corresponding to the portion of the programming code across a bridge to a native platform of the client system (e.g., an iOS or Android device). The instructions are then executed in the native layer of the client system. Thus, the cross-platform application may appear to a user of the client system to be entirely implemented within the native layer of the client system. Thus, the controller acts as a client-side server of instructions for the engine at the native layer and the engine at the cross-platform layer.

In various embodiments, there may be an interface between the controller and the native view layers of multiple devices that specifies a contract stating that each of the native view layers will implement particular instructions. For example, each of the native view layers may agree to implement a function, such as "animate a rectangle containing the name of the winner onto the screen from the left." Then, when the controller detects a corresponding programming code in the cross-platform application, the controller may send an instruction to the view layer to execute the function that the view layer provides according to the contract. The actual implementation of the function at each client system may be limited only by the capabilities of the client system.

In various embodiments, the controller may determine whether a programming instruction should be implemented by the native layer or the cross-platform layer of the client system based on various factors. For example, the controller may determine how executing the instruction at the native layer would compare to executing the instruction at the cross-platform layer in terms of various factors, such as efficiency, performance, power, speed, look-and-feel, smoothness of a rendering of a graphical element of a user interface, and so on. This determination may be based on data collected and maintained by the controller upon prior executions of the programming code or on data received from a networking server. As another example, the controller may base the determination of where to execute the programming instruction on whether the native layer includes a capability with respect to the executing of the programming instruction that the cross-platform layer lacks, such as a capability pertaining to the rendering of an advanced animation.

In various embodiments, the controller may detect that a capability of a cross-platform layer has improved (e.g., based on a new version of the cross-platform layer being installed in the device). In this case, the controller may determine that the cross-platform layer is now just as capable of executing the instruction as the native layer despite previous versions of the cross-platform layer being less capable of executing the instruction than the native layer. Thus, upgrades to the cross-platform layer may eventually render implementations of a corresponding view objects in the native layer obsolete.

FIG. 1 is a block diagram illustrating an example of a system 100 for implementing various disclosed embodiments. In particular embodiments, system 100 comprises player 101, social networking system 120a, game networking system 120b, client system 130, and network 160. The components of system 100 may be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, thereby bypassing network 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state, etc.). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both. As used herein, the terms "player" and "user" can be used interchangeably and can refer to any user or character in an online multiuser game system or social networking system. As used herein, the term "friend" can mean any node within a player's social network.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system 920b, which can be accessed over any suitable network with an appropriate client system 930. A player may have a game system account on game networking system 920b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 920b and merely accessed via the third-party website. The embedded online game can be hosted solely on a server of game networking system 920b or using a third-party vendor server. In addition, any combination of the functions of the present disclosure can be hosted on or provided from any number of distributed network resources. For example, one or more executable code objects that implement all or a portion of the game can be downloaded to a client system for execution.

Communication Systems

Systems for managing communications between the various client systems 130 and other systems, such as the game networking system 120b, may be used or selected based on differences between the client systems 130. For example, a mobile device communicating with the game networking server 120b via a first client application executing on the Apple iOS operating system or the Open Handset Alliance Android operating system may select a different system for handling communications than a personal computer device that communicates with the game networking system 120b via a second client application, such as a web browser or an application executing within the web browser, executing on a Windows operating system. The system for managing communications may be selected or used based on various other factors, such as a type of network over which the client system 130 is connected (e.g., a wireless network or a wired network) or attributes of the client system 130, such as a number of communication channels that are available on the client system 130 for transmitting or receiving communications.

In communications between a mobile device and a server, every network hit may be a liability. A hit is not the payload that is being sent, but rather the process of asking for the payload to be sent (e.g., the process of spinning up a network connection, transmitting data, and receiving a response to the transmitted data). For example, in terms of a performance of the system 100, it may not matter whether a client is asking for 15 or 150 responses from a server as much as it matters how many times the client must ask for those 15 or 150 things. By batching transactions into configurable, structured groups as described herein, a performance the system 100 as a whole may be improved. For example, the impact of playing a game on the performance of the client system 130 may be reduced by saving the client system 130 the resources that would be involved in managing individual transactions back and forth across the network.

Figure 2A:
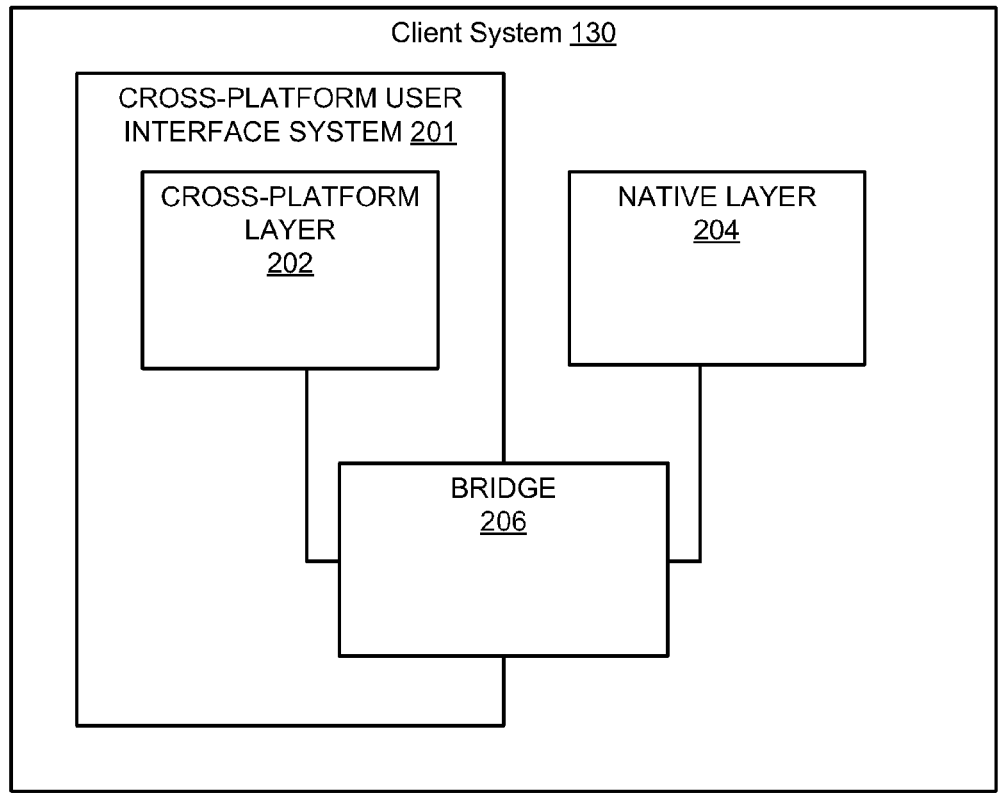
FIG. 2A is a block diagram illustrating an example embodiment of one of the client systems of FIG. 1.

FIG. 2A is a block diagram illustrating an example embodiment of one of the client systems 130 of FIG. 1. The client system includes a cross-platform user interface system 201 that is configured to present a user interface of a web application (e.g., a computer game) to a user of the client system 130. In various embodiments, the cross-platform user interface system 201 may be a web browser, desktop widget, PDF viewer, or other cross-platform software application. The cross-platform user interface system 201 may include a cross-platform layer 202 that is configured to execute programming code with respect to the cross-platform user interface system 201. The programming code may be independent of a native layer 204 (e.g., an operating system) of the client system 130 on which the user interface system 201 is executing. For example, the programming code may be Javascript, Jscript, ECMAScript, and so on. The execution of the programming code by the cross-platform layer 202 may be performed by a cross-platform engine, such as a JavaScript engine, that is associated with the cross-platform user interface system 201.

The execution of the programming code may enhance the user interface of the web application. For example, the execution of the programming code may make the web application respond to user actions quickly (e.g., without requiring back-and-forth communications to the web server that is serving the web application), detect and respond to user actions, such as individual keystrokes, that an underlying mark-up language (e.g., HTML) associated with the web application cannot detect and respond to. The programming code may be embedded in the underlying mark-up language of a web page of the web application or interact with a Document Object Model (DOM) of the web application. For example, the programming code may open up new windows, validate input values on a web form, change images as a mouse cursor moves over them, transmit information about the user's browsing activities to a web server, or render animations. The programming code may enable the user interface of the web application to access computational objects on the client system 130.

The programming code may implement the web application as an Ajax application, enabling the web application to communicate with a server in the background. Such programming code may bring multiple web application technologies together, including HTML (or XHTML) and CSS for presentation, the DOM for dynamic display of an interaction with data, XML and XLST for the interchange of data and manipulation of data, respectively, or an XMLHttpRequest object for asynchronous communication. The web application may request objects in JavaScript Object Notation (JSON) format from the server.

The client system 130 also includes a native layer 204 that is configured to execute software applications that are native to the client system 130. For example, if the native layer 204 is the Apple iOS, the native layer 204 may be configured to execute software applications developed in the C or Objective C language and compiled for the Apple iOS (using the Apple iOS software development kit (SDK)). Or, if the native layer 204 is the Google Android operating system, the native layer 204 may be configured to execute software applications developed in Java and compiled using the Google Android SDK).

The client system 130 also includes a bridge 204 that is configured to enable the cross-platform programming code to access that native layer 204. Because it has access to the native layer 204, the cross-platform programming code may include references to programming objects that are implemented in the native layer 204 as well as references to programming objects that are implemented in the cross-platform layer 202. The bridge 204 identifies cross-platform programming code that corresponds to programming objects that are implemented in the native layer 204 and handles communication between the cross-platform layer 202 and the native layer 204 to enable the cross-platform programming code to access the programming objects that are implemented in the native layer 204.

In various embodiments, the cross-platform programming code that is to be executed within the cross-platform user interface system 202 is architected according to a model-view-controller (MVC) pattern, such as the MVC pattern described in "Application Programming in Smalltalk-80: How to use Model-View-Controller (MVC)" by Steve Burbeck. Thus, the cross-platform programming code is separated into model objects that manage the behavior and data of the web application and respond to requests for information about its state (e.g., from a view object), and response to instructions to change its state (e.g., from a controller object), view objects that manage the display of information, and controller objects that interpret mouse and keyboard inputs from the user and handle notifications to the model or view objects to change.

In various embodiments, the view objects for the application are implemented in the native layer 204, whereas the model objects and controller objects are implemented in the cross-platform layer 202. The controller objects are then implemented such that they may detect whether an execution of cross-platform code requires a change to information that is displayed in the cross-platform user interface system 201. If changes to the information that is displayed are to be made, the controller objects invoke the required functionality of one or more of the native view objects via the bridge 206. If, on the other hand, changes to the model are to be made, the controller invokes the functionality of the model objects via the cross-platform layer 202.

In various embodiments, the view objects are specific to each of the possible platforms (e.g., operating systems) of the client systems 130 on which the web application is to be deployed. Thus, it may be necessary to deploy a different set of view objects on each such client system 130. However, the controller objects and model objects may be implemented entirely in the cross-platform layer 202; thus, the same programming code for the controller objects and model objects may be deployed on each client system 130, regardless of any differences between the native layers 204 executing on each client system 130. In this way, the aspects of the user interface for the web application that must be implemented in the native layer 204 for each client system 130 is minimized.

In various embodiments, the functionality of two or more of the view objects for each of the possible platforms of the client systems 130 are abstracted into a single view object that is deployed on each of the corresponding client systems 130. Thus, a single call to an API of the view object from the cross-platform code may produce a device-specific result in each of the two or more of the client systems 130 regardless of any differences in the native layer 204 of each of the two or more of the client systems 130.

Figure 2B:
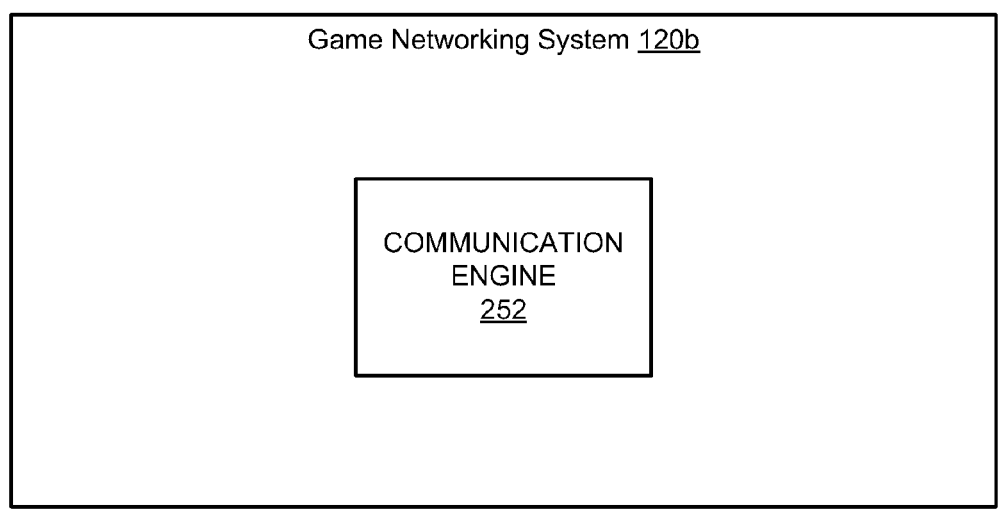
FIG. 2B is a block diagram of an example embodiment of the game networking system of FIG. 1.

FIG. 2B is a block diagram of an example embodiment of the game networking system 120b of FIG. 1. The game networking system 120b includes a communication engine 252 that is configured to handle communications between the portion of the web application that is executing in the game networking system 120b and the portion of the web application code that is executing on the client systems 130. In various embodiments, the communications sent from the game networking system 120b to the client systems 130 is independent of the native layers 204 of each of the client system 130. For example, in requesting an update to the user interface of the web application, the game networking system 120b sends the same HTML, CSS, and JavaScript to each of the client systems 130 regardless of the native layers 204 of the client systems 130. Thus, any variations in the handling of the requests received from the server at the client systems 130 are a result of differences between the implementations of the view objects that are deployed on the client systems 130.

Figure 3:
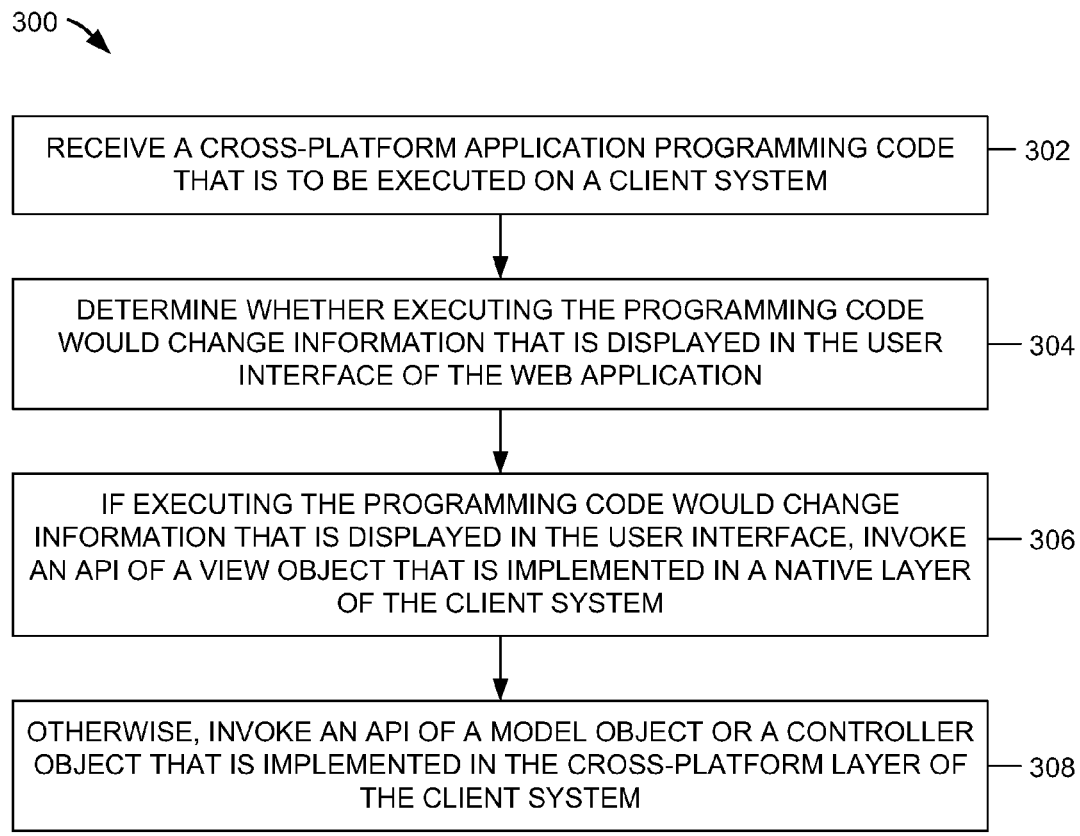
FIG. 3 is an example embodiment of a method of executing cross-platform application code on one of the client systems.

FIG. 3 is an example embodiment of a method 300 of executing cross-platform application code on one of the client systems 130. A distribution module executing on the device receives the cross-platform web application programming code from the game networking system 120b. The distribution module determines whether executing the programming code would change information that is displayed in the user interface of the web application. If the executing of the programming code would change information that is displayed in the user interface, the distribution module invokes an application programming interface (API) corresponding to a view object that is implemented in the native layer 204 of the client system 204 (e.g., via the bridge 206). Otherwise, the distribution module invokes an API corresponding to a model object or a controller object implemented in the cross-platform layer 202 of the client system 130.

Figure 4:
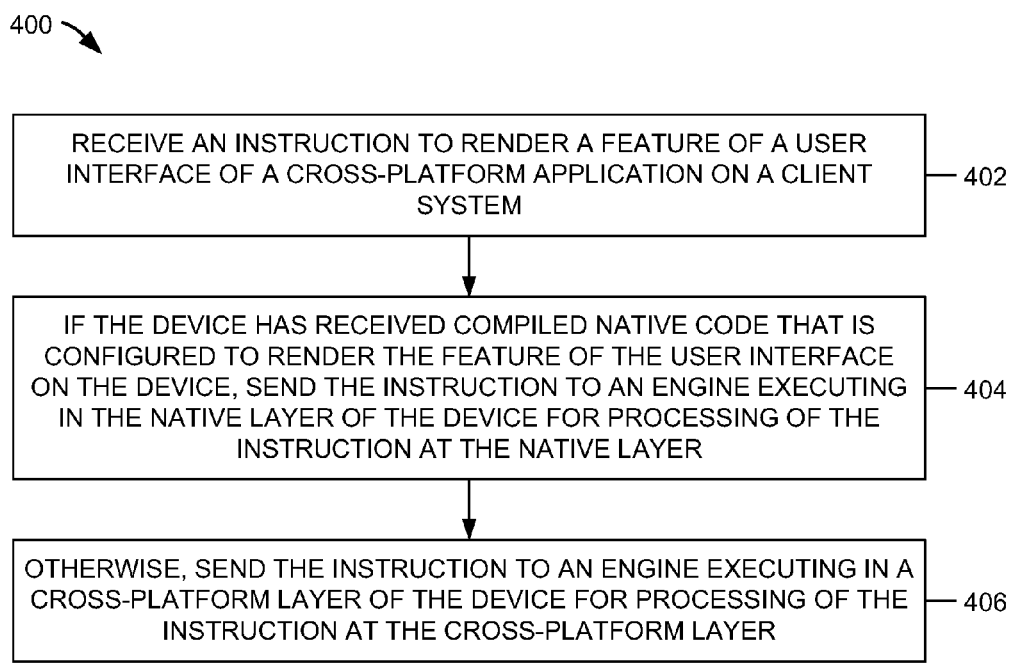
FIG. 4 is an example embodiment of a method of rendering a feature of a user interface of a cross-platform application on a device.

FIG. 4 is an example embodiment of a method 400 of rendering a feature of a user interface of a cross-platform application on a device. A module executing on the device receives an instruction to render the feature of the user interface of the cross-platform application. If the device has received compiled native code that is configured to render the feature of the user interface of the cross-platform application on the device, the module sends the instruction to an engine executing in a native layer of the device for processing of the instruction by the compiled native code. Otherwise, the module sends the instruction to an engine executing in a cross-platform layer of the device for processing.

Figure 5:
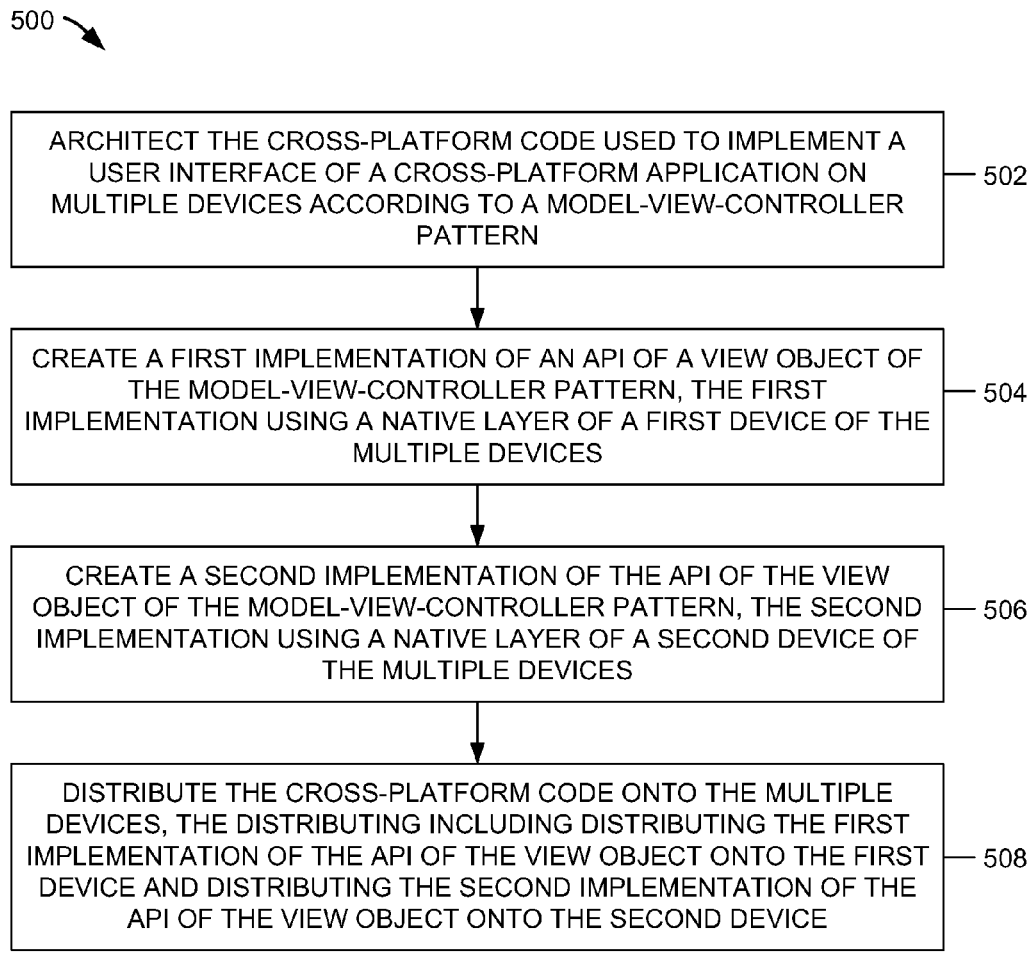
FIG. 5 is an example embodiment of a method of enabling access to native features specific to each of multiple devices from a common cross-platform programming code used to implement a user interface of a cross-platform application on each of the multiple devices.

FIG. 5 is an example embodiment of a method 500 of enabling access to native features specific to each of multiple devices from a common cross-platform programming code used to implement a user interface of a cross-platform application on each of the multiple devices. At operation 502, an architecture module architects the cross-platform programming code used to implement the user interface of the cross-platform application on each of the multiple devices according to a model-view-controller (MVC) pattern. At operation 504, the architecture module creates a first implementation of an API of a view object of the MVC pattern. The first implementation uses a native layer of a first device of the multiple devices. At operation 506, the architecture module creates a second implementation of the API of the view object of the model-view controller pattern. The second implementation uses a native layer of a second device of the multiple devices. At operation 508, a distribution module distributes the cross-platform code onto the multiple devices. This distributing includes distributing the first implementation of the API of the view object onto the first device and distributing the second implementation of the API of the view object onto the second device.

In various embodiments, a selection module selects portions of the API of the view object that are to be implemented in the native layers of each of the multiple devices. The selection may be based on a comparison of features that the device supports in the native layer with features that the device supports at the cross-platform layer. For example, if a device supports better rendering of advanced animations at the native layer than at the cross-platform layer, the selection module may select a portion of the API of the view object for that pertains to rendering advanced animations to be implemented at the native layer of the device. Thus, when the execution of the cross-platform code of the user interface of a web application calls for the rendering of an advanced animation, the rendering is performed at the native layer of the device instead of at the cross-platform layer of the device. This selection of which of the API of the view object are to be implemented on each device ensures that not only are native features of the device made accessible to the cross-platform code, but also only the minimum amount of native code needed to access the feature need be deployed on the device.

In various embodiments, the architecture module implements the API of a programming object in programming code that is an abstraction of an API corresponding to the programming code that is native to the first one of the multiple devices and an abstraction of an API corresponding to the programming code that is native to the second one of the multiple devices. The distribution module deploys a bridge on each of the first one of the multiple devices and the second one of the multiple devices, the bridge enabling the API of the programming object to access that native compiled code of the first one of the multiple devices and the second one of the multiple devices, respectively. The distribution module deploys a controller element of the model-view-controller architecture of the cross-platform application on each of the first one of the multiple devices and the second one of the multiple devices. During execution of the programming code of the cross-platform application, the controller element distributes the processing of the instructions of the cross-platform programming code to either the compiled native code across the bridge or a cross-platform engine executing on the device.

Game Interfaces

In various embodiments, a user 101 of a client system 1030 can use a browser client (e.g., Firefox, Chrome, Internet Explorer, etc.) to access the online game over the Internet (or other suitable network). For example, a game interface may be automatically generated and presented to the user in response to the user visiting or accessing the game operator's website or a third-party's website from client system 130 with a browser client. Game networking system 120b can transmit data to client system 130, thereby allowing it to display the game interface, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. The game interface is configured to receive signals from the user 101 via client system 130. For example, the user 101 can click on the game interface or enter commands from a keyboard or other suitable input device. The game engine can respond to these signals to allow game play. The display of the game interface can change based on the output of the game engine, the input of the player, and other signals from game networking system 120b and client system 130.

The game interface can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to the game interface.

The user can also click on various user interface elements in the game interface to activate various game options. For example, for a poker game, if the user clicks on one of the buttons in an action bar to call, fold, or raise, the game engine will alter the game interface to show the result of the action. For example, the player could click on the All-in button and the Raise button, causing the game engine to alter the game interface to show all of the player's chips moving toward the center of the table.

One skilled in the art would appreciate that the present disclosure is intended to encompass a variety of game types, including gambling games, role-playing games, puzzle games, and the like.

Data Flow

Figure 6:
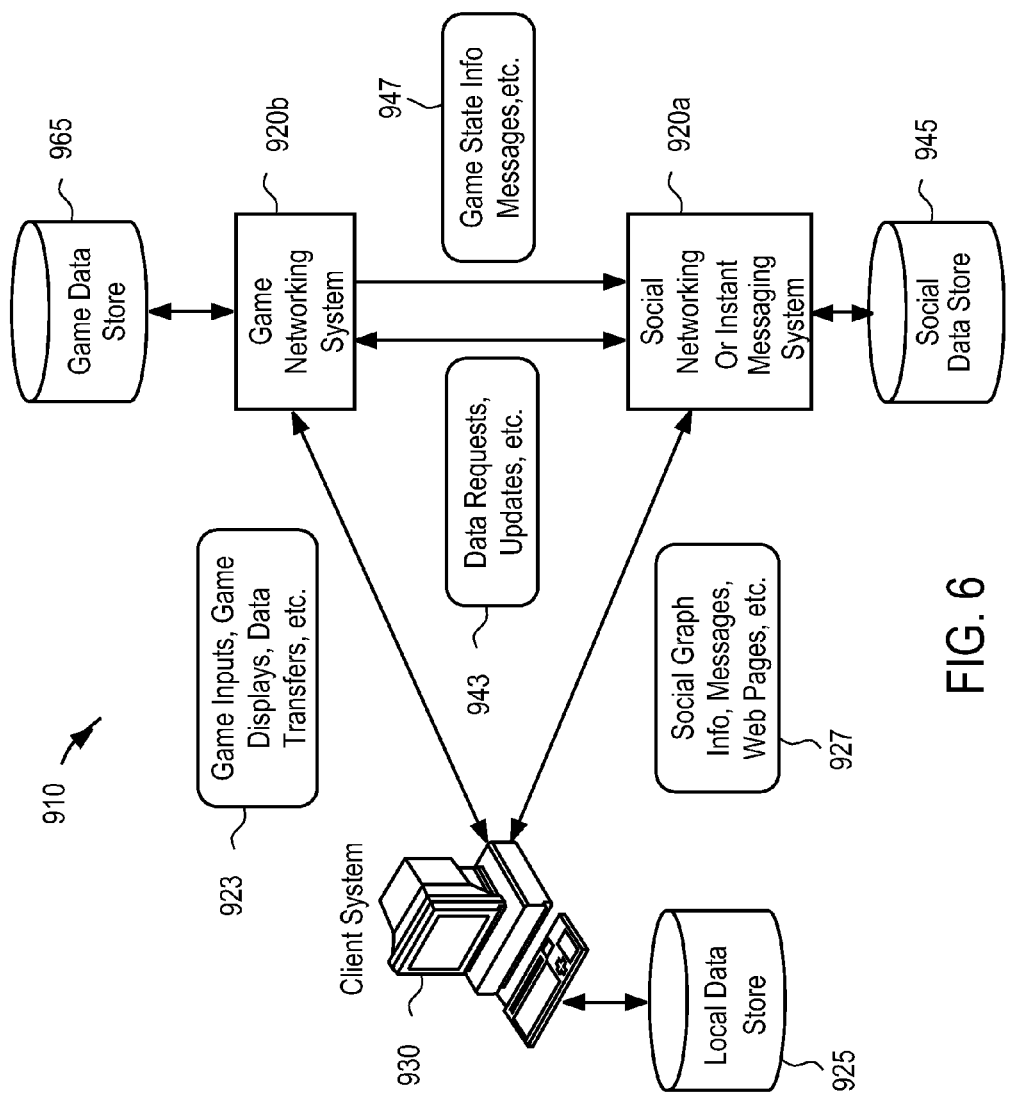
FIG. 6 is a block diagram illustrating an example data flow between the components of a system.

FIG. 6 is a block diagram illustrating an example data flow between the components of system 910. In particular embodiments, system 910 can include client system 930, social networking system 920a, and game networking system 920b. The components of system 910 can be connected to each other in any suitable configuration, using any suitable type of connection. The components may be connected directly or over any suitable network. Client system 930, social networking system 920a, and game networking system 920b can each have one or more corresponding data stores such as local data store 925, social data store 945, and game data store 965, respectively. Social networking system 920a and game networking system 920b can also have one or more servers that can communicate with client system 930 over an appropriate network. Social networking system 920a and game networking system 920b can have, for example, one or more internet servers for communicating with client system 930 via the Internet. Similarly, social networking system 920a and game networking system 920b can have one or more mobile servers for communicating with client system 930 via a mobile network (e.g., GSM, PCS, Wi-Fi, WPAN, etc.). In some embodiments, one server may be able to communicate with client system 930 over both the Internet and a mobile network. In other embodiments, separate servers can be used.

Client system 930 can receive and transmit data 923 to and from game networking system 920b. This data can include, for example, webpages, messages, game inputs, game displays, HTTP packets, data requests, transaction information, updates, and other suitable data. At some other time, or at the same time, game networking system 920b can communicate data 943, 947 (e.g., game state information, game system account information, page info, messages, data requests, updates, etc.) with other networking systems, such as social networking system 920a (e.g., Facebook, Myspace, etc.). Client system 930 can also receive and transmit data 527 to and from social networking system 920a. This data can include, for example, webpages, messages, social graph information, social network displays, HTTP packets, data requests, transaction information, updates, and other suitable data.

Communication between client system 930, social networking system 920a, and game networking system 920b can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 920b, the BLOB containing the game state for the instance corresponding to the player can be transmitted to client system 930 for use by a client-side executed object to process. In particular embodiments, the client-side executable may be a Flash-based game, which can de-serialize the game state data in the BLOB. As a player plays the game, the game logic implemented at client system 930 maintains and modifies the various game state parameters locally. The client-side game logic may also batch game events, such as mouse clicks, and transmit these events to game networking system 920b. Game networking system 920b may itself operate by retrieving a copy of the BLOB from a database or an intermediate memory cache (memcache) layer. Game networking system 920b can also deserialize the BLOB to resolve the game state parameters and execute its own game logic based on the events in the batch file of events transmitted by the client to synchronize the game state on the server side. Game networking system 920b may then re-serialize the game state, now modified, into a BLOB and pass this to a memory cache layer for lazy updates to a persistent database.

With a client-server environment in which the online games may run, one server system, such as game networking system 920b, may support multiple client systems 930. At any given time, there may be multiple players at multiple client systems 930 all playing the same online game. In practice, the number of players playing the same game at the same time may be very large. As the game progresses with each player, multiple players may provide different inputs to the online game at their respective client systems 930, and multiple client systems 930 may transmit multiple player inputs and/or game events to game networking system 920b for further processing. In addition, multiple client systems 930 may transmit other types of application data to game networking system 920b.

In particular embodiments, a computed-implemented game may be a text-based or turn-based game implemented as a series of web pages that are generated after a player selects one or more actions to perform. The web pages may be displayed in a browser client executed on client system 930. As an example and not by way of limitation, a client application downloaded to client system 930 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 920a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 930, either caused by an action of a game player or by the game logic itself, client system 930 may need to inform game networking system 920b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 910 is discussed in reference to updating a multi-player online game hosted on a network-addressable system (such as, for example, social networking system 920a or game networking system 920b), where an instance of the online game is executed remotely on a client system 930, which then transmits application event data to the hosting system such that the remote game server synchronizes the game state associated with the instance executed by the client system 930.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 930 may include a Flash client. The Flash client may be configured to receive and run Flash applications or game object codes from any suitable networking system (such as, for example, social networking system 520a or game networking system 920b). In particular embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 930, the Flash client may send the events that caused the game state changes to the in-game object to game networking system 920*b*. However, to expedite the processing and hence the speed of the overall gaming experience, the Flash client may collect a batch of some number of events or updates into a batch file. The number of events or updates may be determined by the Flash client dynamically or determined by game networking system 920*b* based on server loads or other factors. For example, client system 930 may send a batch file to game networking system 920*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 930. In particular embodiments, the batch file may be a text file and the name-value pairs may be in string format.

In particular embodiments, when a player plays an online game on client system 930, game networking system 920*b* may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 920*b* may retrieve the corresponding BLOB from the database to determine the most-recent values of the game-related data. In particular embodiments, while a player is playing the online game, game networking system 920*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
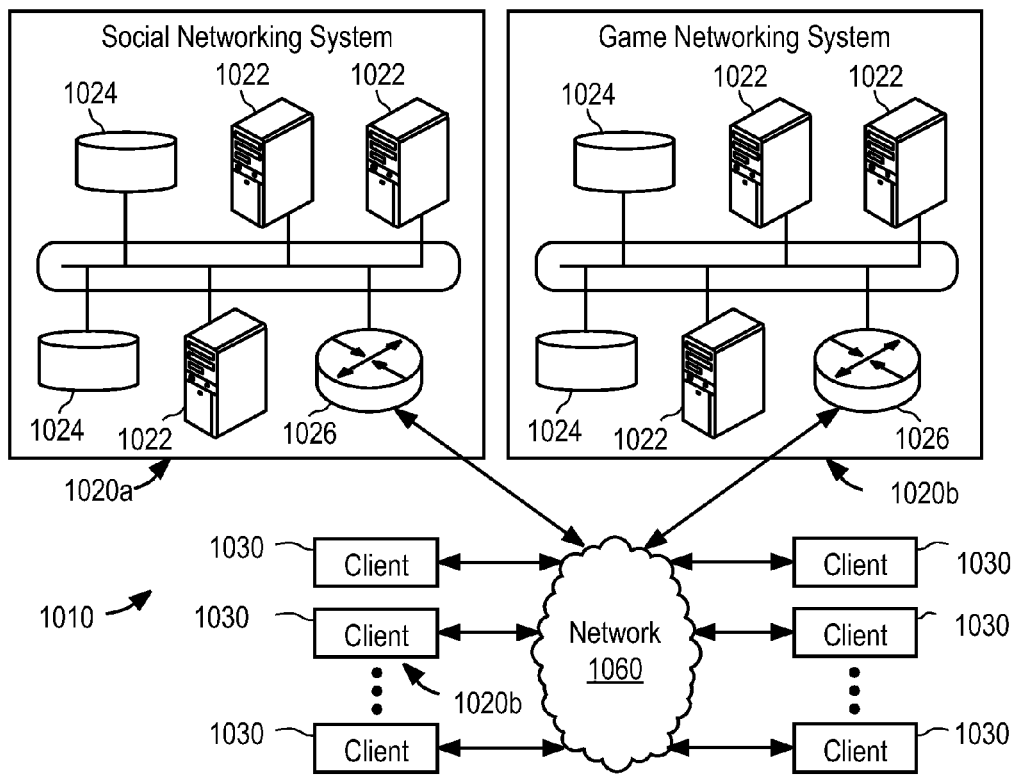
FIG. 7 is a block diagram illustrating an example network environment 1010, in which various example embodiments may operate.

Particular embodiments may operate in a wide area network environment, such as the Internet, including multiple network addressable systems. FIG. 7 is a block diagram illustrating an example network environment 1010, in which various example embodiments may operate. Network cloud 1060 generally represents one or more interconnected networks, over which the systems and hosts described herein can communicate. Network cloud 1060 may include packet-based WANs (such as the Internet), private networks, wireless networks, satellite networks, cellular networks, paging networks, and the like. As FIG. 10 illustrates, particular embodiments may operate in a network environment comprising one or more networking systems, such as social networking system 1020*a*, game networking system 1020*b*, and one or more client systems 1030. The components of social networking system 1020*a* and game networking system 1020*b* operate analogously; as such, hereinafter they may be referred to simply as networking system 1020. Client systems 1030 are operably connected to the network environment via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as a target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user identifier (ID), as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment 1010 described above and illustrated in FIG. 7 described with respect to social networking system 1020a and game networking system 1020b, this disclosure encompasses any suitable network environment using any suitable systems. As an example and not by way of limitation, the network environment may include online media systems, online reviewing systems, online search engines, online advertising systems, or any combination of two or more such systems.

Figure 8:
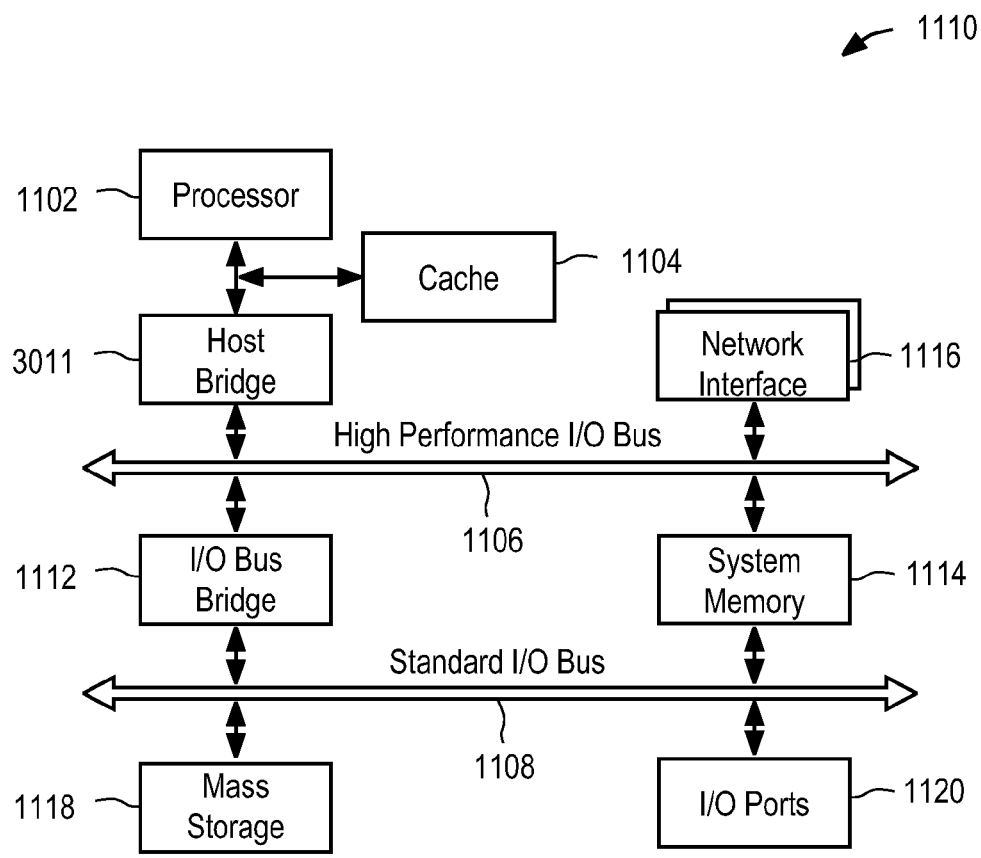
FIG. 8 is a block diagram illustrating an example computing system architecture, which may be used to implement a server or a client system.

FIG. 8 is a block diagram illustrating an example computing system architecture, which may be used to implement a server 1022 or a client system 1030. In one embodiment, hardware system 1110 comprises a processor 1102, a cache memory 1104, and one or more executable modules and drivers, stored on a tangible computer readable medium, directed to the functions described herein. Additionally, hardware system 1110 may include a high performance input/output (I/O) bus 1106 and a standard I/O bus 1108. A host bridge 1111 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1110 may further include video memory (not shown) and a display device coupled to the video memory. Mass storage 1118 and I/O ports 1120 may couple to bus 1108. Hardware system 1110 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1110 are described in greater detail below. In particular, network interface 1116 provides communication between hardware system 1110 and any of a wide range of networks, such as an Ethernet (e.g., IEEE 802.3) network, a backplane, and so forth. Mass storage 1118 provides permanent storage for the data and programming instructions to perform the above-described functions implemented in servers 1022, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1110.

Hardware system 1110 may include a variety of system architectures and various components of hardware system 1110 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1110 being coupled to the single bus. Furthermore, hardware system 1110 may include additional components, such as additional processors, storage devices, or memories.

An operating system manages and controls the operation of hardware system 1110, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
one or more processors of a device; and
one or more modules implemented by the one or more processors, the one or more modules configured to, at least:
identify a capability of the device with respect to a rendering of a portion of a user interface of a cross-platform application;
request a device-specific implementation of an object of the cross-platform application from a separate server system based on the identifying of the capability;
receive the device-specific implementation of the object from the separate server system, the device-specific implementation including compiled native code usable for the rendering of the portion of the user interface at a native layer of the device;
receive a version of a cross-platform implementation of the object from the separate server system, the cross-platform implementation usable for rendering the portion of the user interface at a cross-platform layer of the device, the cross-platform implementation also usable for rendering the portion of the user interface at a cross-platform layer of an additional device, a native layer of the additional device being different from the native layer of the device;
receive an instruction pertaining to an execution of the cross-platform application on the device; and
based on an analysis of factors pertaining to an execution of the instruction at the native layer of the device and an execution of the instruction at the cross-platform layer of the device, perform one of using the device-specific implementation of the object to process the instruction at the native layer and using the version of the cross-platform implementation of the object to process the instruction at the cross-platform layer, the analysis of the factors performed automatically upon the receiving of the instruction by a controller executing on the device, the controller comparing data pertaining to prior executions of the instruction using the device-specific implementation of the object to data pertaining to prior executions of the instruction using the version of the cross-platform implementation of the object with respect to the factors.

2. The system of claim 1, wherein the native layer is one of an iOS operating system layer and an Android operating system layer and the cross-platform layer is an HTML5 layer.

3. The system of claim 1, wherein the using of the compiled native code includes sending the instruction across a bridge that enables the object to access the native compiled code from the cross-platform layer.

4. The system of claim 1, wherein the analysis of the factors includes a determination of whether the native layer has a more powerful capability with respect to the rendering of the portion of the user interface than the cross-platform layer.

5. The system of claim 1, wherein the analysis of the factors includes a determination of whether the native layer would have better performance with respect to the rendering of the portion of the user interface than the cross-platform layer.

6. The system of claim 1, wherein the analysis of the factors includes a determination of whether an upgrade to the version of the cross-platform implementation of the object has made the device-specific implementation of the object obsolete.

7. A method comprising:
identifying a capability of a device with respect to a rendering of a portion of a user interface of a cross-platform application;
requesting a device-specific implementation of an object of the cross-platform application from a separate server system based on the identifying of the capability;
receiving the device-specific implementation of the object from the separate server system, the device-specific implementation including compiled native code usable for the rendering of the portion of the user interface at a native layer of the device;
receiving a version of a cross-platform implementation of the object from the separate server system, the cross-platform implementation usable for rendering the portion of the user interface at a cross-platform layer of the device, the cross-platform implementation also usable for rendering the portion of the user interface at a cross-platform layer of an additional device, a native layer of the additional device being different from the native layer of the device;

receiving an instruction pertaining to an execution of the cross-platform application on the device; and based on an analysis of factors pertaining to an execution of the instruction at the native layer of the device and an execution of the instruction at the cross-platform layer of the device, performing one of using the device-specific implementation of the object to process the instruction at the native layer and using the version of the cross-platform implementation of the object to process the instruction at the cross-platform layer, the analysis of the factors performed automatically upon the receiving of the instruction by a controller executing on the device, the controller comparing data pertaining to prior executions of the instruction using the device-specific implementation of the object to data pertaining prior executions of the instruction using the version of the cross-platform implementation of the object with respect to the factors.

8. The method of claim 7, wherein the native layer is one of an iOS operating system layer and an Android operating system layer and the cross-platform layer is an HTML5 layer.

9. The method of claim 7, wherein the using of the compiled native code includes sending the instruction across a bridge that enables the object to access the native compiled code from the cross-platform layer.

10. The method of claim 7, wherein the analysis of the factors includes a determination of whether the native layer has a more powerful capability with respect to the rendering of the portion of the user interface than the cross-platform layer.

11. The method of claim 7, wherein the analysis of the factors includes a determination of whether the native layer would have better performance with respect to the rendering of the portion of the user interface than the cross-platform layer.

12. The method of claim 7, wherein the analysis of the factors includes a determination of whether an upgrade to the version of the cross-platform implementation of the object has made the device-specific implementation of the object obsolete.

13. A non-transitory computer-readable medium comprising a set of instructions that, when executed by at least one processor of a computer system, cause the computer system to perform operations, the operations comprising:

identifying a capability of a device with respect to a rendering of a portion of a user interface of a cross-platform application;

requesting a device-specific implementation of an object of the cross-platform application from a separate server system based on the identifying of the capability;

receiving the device-specific implementation of the object from the separate server system, the device-specific implementation including compiled native code usable for the rendering of the portion of the user interface at a native layer of the device;

receiving a version of a cross-platform implementation of the object from the separate server system, the cross-platform implementation usable for rendering the portion of the user interface at a cross-platform layer of the device, the cross-platform implementation also usable for rendering the portion of the user interface at a cross-platform layer of an additional device, a native layer of the additional device being different from the native layer of the device;

receiving an instruction pertaining to an execution of the cross-platform application on the device; and based on an analysis of factors pertaining to an execution of the instruction at the native layer of the device and an execution of the instruction at the cross-platform layer of the device, performing one of using the device-specific implementation of the object to process the instruction at the native layer and using the version of the cross-platform implementation of the object to process the instruction at the cross-platform layer, the analysis of the factors performed automatically upon the receiving of the instruction by a controller executing on the device, the controller comparing data pertaining to prior executions of the instruction using the device-specific implementation of the object to data pertaining to prior executions of the instruction using the version of the cross-platform implementation of the object with respect to the factors.

14. The non-transitory computer-readable medium of claim 13, the native layer is one of an iOS operating system layer and an Android operating system layer and the cross-platform layer is an HTML5 layer.

15. The non-transitory computer-readable medium of claim 13, wherein the using of the compiled native code includes sending the instruction across a bridge that enables the object to access the native compiled code from the cross-platform layer.

16. The non-transitory computer-readable medium of claim 13, wherein the analysis of the factors includes a determination of whether the native layer has a more powerful capability with respect to the rendering of the portion of the user interface than the cross-platform layer.

17. The non-transitory computer-readable medium of claim 13, wherein the analysis of the factors includes a determination of whether the native layer would have better performance with respect to the rendering of the portion of the user interface than the cross-platform layer.

* * * * *